March 8, 1949.  E. F. FLINT  2,463,959

PRISMATIC TELESCOPE

Filed April 26, 1946

EDWARD F. FLINT
Inventor

Attorney

Patented Mar. 8, 1949

2,463,959

UNITED STATES PATENT OFFICE 2,463,959

PRISMATIC TELESCOPE

Edward F. Flint, Rochester, N. Y., assignor to Bausch & Lomb Optical Company, Rochester, N. Y., a corporation of New York Application April 26, 1946, Serial No. 665,258

8 Claims. (Cl. 88—33)

The present invention relates to telescopes and more particularly to telescopes of the prismatic type wherein the image formed by the objective lens is inverted and reverted by prismatic means.

It is an object of the present invention to provide a novel device of the above type which is small in overall dimensions, simple in structure, economical to manufacture, light in weight, and of balanced form for easy handling.

It is another object to provide such a device in which the prismatic elements are reliably mounted and correctly aligned by improved mounting means.

It is a further object to provide such a device wherein proper alignment and security of the mounting of the prismatic elements is assured regardless of temperature changes in the ambient air.

It is a further object to provide such a device with a symmetrical casing jointed in such a manner that the prismatic elements are protected from entrance of foreign matter but are easily accessible for cleaning when the casing is unjointed.

Figure 1:
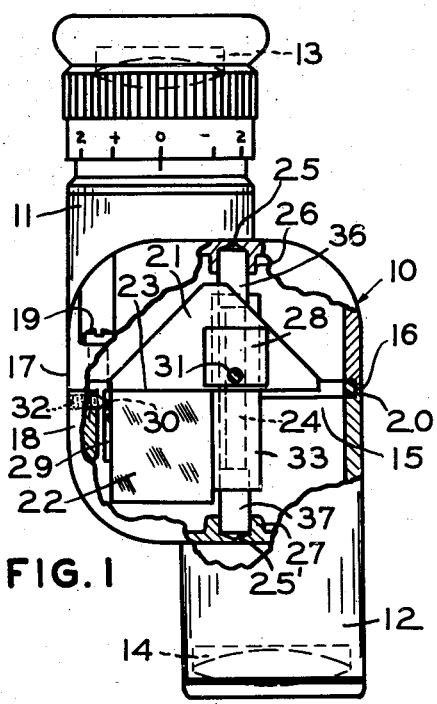
Figure 2:
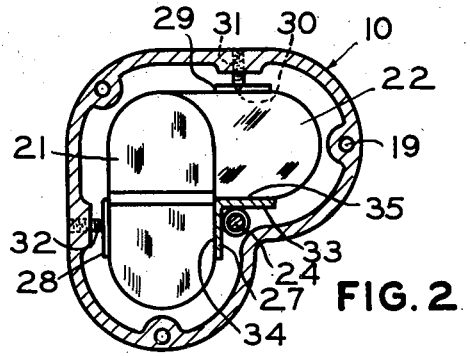
Figure 3:
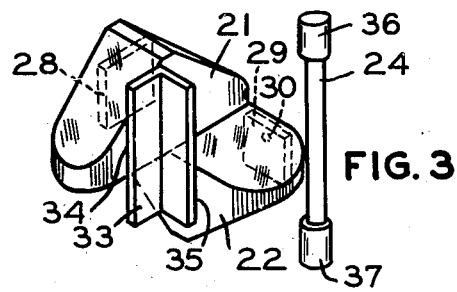
Figure 4:
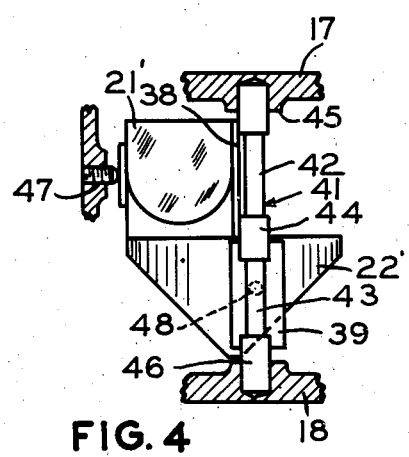
Figure 5:
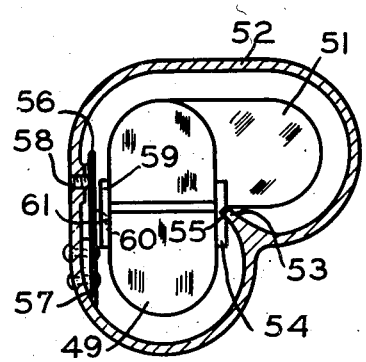

Further objects and advantages will be apparent to those skilled in the art by reference to the following description and accompanying drawing in which;

Fig. 1 is a front elevation, partly in section, of a preferred form of the present invention, Fig. 2 is a plan view of the prismatic elements with the casing shown in section, Fig. 3 is a disassembled perspective view of the prismatic elements and the mounting post therefor, Fig. 4 is a side elevation partly in section of a modified form of the mounting post and bearing pads for the prismatic elements, and Fig. 5 is a fragmentary view, partly in section, of a further modified form of prismatic mounting.

The preferred form of the invention, as illustrated in Fig. 1, comprises a casing 10 having the axially offset tubular portions 11 and 12 at the opposite ends of which ocular lens 13 and objective lens 14, respectively, are mounted. At the juncture of the offset portions 11 and 12, the casing 10 is enlarged to form a chamber 15 that is transversely bisected by a sealed joint 16 to provide two symmetrically similar casing members 17 and 18. The casing members 17 and 18 are held together by any suitable means such as screws 19 so as to compressibly hold a sealing gasket 20 therebetween. Prismatic means for inverting and reverting the image formed by the objective lens 14 are provided in the form of a pair of crossed right angle prisms 21 and 22, with the hypotenuse faces cemented together at 23, and clamped within the enlarged chamber 15 in optical alignment with the lenses of the telescope. The light rays entering the telescope through the objective lens 14 are angularly reflected by the prisms 21 and 22 so as to emerge from the eyepiece lens 13 on an axis offset from the axis of the objective lens in a well-known manner.

According to the present invention, means for mounting and aligning the prisms 21 and 22 are provided in the form of an elongated mounting member of any desired shape such as a post or rod 24. As shown in the preferred embodiment, the mounting member or post 24 extends parallel to the axis of the telescope across the chamber 15, and is slidably seated at its ends into the cylindrical recesses 25 and 25' formed in the casing bosses 26 and 27.

Locating means in the form of pads 28 and 29 are affixed to the sides of prisms 21 and 22, respectively, in any suitable way such as cementing, and in the pad 29 a conical hole 30 is formed. Clamping members, preferably in the form of screws 31 and 32 which are seated approximately opposite to the longest edge of the prisms 21 and 22 in the casing 10 bear against the locating pads 28 and 29 to hold the prisms in assembled position against the mounting post or rod 24. The screw 32 has a conical point thereon fitting within the conical hole 30 in the pad 29 to prevent longitudinal or rotational displacement of the prisms 21 and 22 relative to the casing. A rigid pressure-transfer member 33 preferably cemented at 34 and 35 to prisms 21 and 22, respectively, carries the clamping stresses that are imparted through the prisms by the screws 31 and 32 to a pair of bearing surfaces 36 and 37 at the ends of the mounting post 24. The bearing surfaces 36 and 37 may, if desired, be formed by undercutting or relieving the outer surface of the post 24 in the vicinity of its mid-section. By use of bearing surfaces 36 and 37, the deflection of the post 24 under clamping pressure or thermal stresses does not affect the optical alignment of the prisms 21 and 22.

In the embodiment of the invention shown in Fig. 4, the pressure-transfer member 33 of Fig. 1 is replaced by individual pressure pads 38 and 39 cemented on the prisms 21' and 22', respectively. A mounting post 41 is formed with reduced-diameter portions 42 and 43 to provide a center bearing surface 44 as well as an outer bearing surface at 45 or 46 for each of the pressure pads 38 and 39. In this type of prism mounting, the clamping screws 47 and 48 are located midway between the bearing surfaces across the side faces of prisms 21' and 22'. This position facilitates distribution of the clamping thrust from screw 47 through the pad 38 equally to the bearing surfaces 45 and 44 or from screw 48 through pad 39 equally to bearing surfaces 46 and 44. By this method of mounting the prisms, the stresses induced due to the difference in thermal expansion between the material of the prisms and the material of the pressure-transfer member 33 of Fig. 1 upon change of temperature are rendered unharmful to the security of the prisms.

The form of the invention illustrated in Fig. 5 provides another type of prism mounting which includes means for yieldingly holding the prisms 49 and 51 within a casing 52, similar to casing 10 of Fig. 1, in correct optical alignment with the lenses of the telescope. In this type of mounting the prisms 49 and 51 are cemented together in the same manner as shown in Fig. 1 but only one prism 49 is directly supported from the mounting member. The mounting member or post by which optical alignment of the prisms is secured in this form of the invention is provided by the elongated rib 53 fixed to the casing 52 and extending longitudinally thereof. A locating pad 54, affixed in any suitable way such as cementing to the prism 49, has a groove 55 formed therein which engages with the mounting member 53 to properly align the prismatic members.

Resilient means for yieldably holding the prism 49 against the mounting member 53 are provided in the form of the flat spring 56 anchored at 57 to the casing 52 and adapted to bear at its other end against an adjustable member of any suitable form such as a screw 58. Clamping contact of the resilient holding means with the prism 49 is established through a second locating pad 59 which is cemented to the prism 49 opposite to pad 54. Pad 59 has therein a conical hole 60 in which a conically-pointed stud 61 mounted on the spring 56 firmly engages. Since the conically-pointed stud 61 is laterally immovable, displacement of the prisms 49 and 51 with reference to the casing 52 is effectively prevented.

When cleaning the telescope, the clamping screws 31 and 32 of Fig. 1 are first loosened, the screws 19 removed, and then the individual parts of the casing 10 are separated. The prismatic members are thereby exposed and accessible for cleaning and if desired, the prism assembly can be removed as a unit. When reassembling the instrument, the mounting post 24 is first inserted within the recess 25' in the boss 27. The prism assembly, including the prisms 21 and 22, the pressure-transfer member 33, and the pressure pads 28 and 29, is then placed against the mounting post 24 in the lower half of the casing 10 and the conically-pointed screw 32 is tentatively placed within the conical hole 30 of pressure pad 29 to initially locate the prismatic unit with reference to the casing 10. The top half of the casing is assembled by first inserting the upper end of the post 24 in the recess 25 of boss 26, pressing the parts 17 and 18 of the casing together and setting the clamping screws 19 tightly in place to hold the parts together. As the final operation, the locating screws 31 and 32 are set up firmly against their respective pressure pads 28 and 29 to secure correct alignment and satisfactory rigidity of the prism assembly.

It will be seen that there is here provided a simple prismatic telescope of balanced construction in which the prismatic structures thereof may easily be cleaned and readily mounted in optical alignment as a unit.

Although but certain embodiments of the invention have been shown and described in detail, other embodiments are possible and changes may be made in the form and arrangement of the parts without departing from the spirit of the invention as defined in the appended claims.

I claim:

1. In a prismatic telescope or the like, the combination of a casing carrying ocular and objective lenses, a post mounted within the casing with its axis substantially parallel with the axes of said lenses, prism means within the casing in optical alignment with the lenses, and holding means carried by the casing, said holding means urging the prism means laterally against the side of the post, the holding means and post coacting to hold the prism means in place and constituting the sole supporting means for the prism means.

2. In a prismatic telescope or the like, the combination of a casing carrying ocular and objective lenses, an elongated post within the casing extending substantially parallel to the axes of the lenses, a pair of right angle prisms having their hypotenuse faces crossed and cemented together, a plate secured to the side of one prism and a screw threaded into the casing with its end exerting pressure on the plate to urge the prism against the side of the post to thereby provide the sole supporting means for the prisms.

3. In a prismastic telescope or the like, the combination of a casing having upper and lower separable parts, said parts respectively having oppositely aligned recesses, an elongated post having its ends slidably mounted in the respective recesses, prism means within the casing, screw means carried by the casing for urging the prism means against the side of the post to thereby provide the sole means for supporting the prism means within the casing.

4. In a telescope or the like having a casing, ocular and objective lenses and a pair of right angle prisms with their hypotenuse faces crossed and cemented together and in optical alignment with the lenses, the combination of a post mounted within the casing with its axis substantially parallel to the axes of the lenses, a plate secured to each of the two sides of each prism, the plates on the two adjacent sides of the prisms being in contact with the side of the post, two screws threaded into the casing and having their ends respectively engaging the other two plates, one of the last named plates having a tapered hole, the end of one screw being tapered to enter said hole, the end of the other screw being substantially flat whereby the prisms are located within the casing and supported solely by pressure urging the prisms against said post.

5. In a telescope of the prismatic type, a two-part casing having a joint between the parts thereof and having an enlarged chamber therein bisected by said joint, an ocular lens mounted in one part and an objective lens mountd in the other part of said casing, said parts having respectively aligned recesses on their inner walls, a pair of cemented crossed right angle prisms located in optical alignment with said lenses within said chamber, a post extending through said chamber and having its ends slidably mounted in the respective recesses, a rigid pressure-transfer member secured to a side of each prism and bearing against said post, locating means on said prisms, and clamping means on said casing cooperating with said post and locating means for holding the prisms against the post and preventing rotational or longitudinal displacement of said prisms relative to said casing.

6. In a telescope of the prismatic type having a casing, oscular and objective lenses and a pair of right angle prisms positioned with their hypotenuse faces crossed and cemented together in optical alignment with the lenses, the combination of a post mounted within the casing with its axis substantially parallel to the optical axes of the lenses, and screw means carried by the sides of the casing for urging the prisms firmly into engagement with the side of the post and thereby providing the sole support for the prisms.

7. In a telescope of the prismatic type, the combination of a casing comprising two separable parts, means for holding the parts together, each part having a recess on its inner wall, a post having its ends slidably mounted in the respective recesses, a prism assembly within the casing, and clamping means carried by the walls of the casing for holding the prism assembly against the side of the post whereby the sole supporting means for the prism assembly is provided.

8. A prismatic telescope or the like comprising a casing having upper and lower separable parts, an ocular mounted in one part, an objective in the other part, said parts having aligned recesses formed respectively on their inner walls, a post having its respective ends slidably mounted in the recesses, said post being substantially parallel to the axes of the ocular and objective, a pair of right angle prisms within the casing, the hypotenuse faces of the prisms being crossed and cemented together, plates secured to both sides of both prisms, two of the adjacent plates being in contact with the side of the post, screws threaded in the wall of the casing and having their ends respectively contacting the other two plates to hold the first two plates against the post and thereby provide the sole supporting means for the prisms.

EDWARD F. FLINT.

REFERENCES CITED

The following references are of record in the file of this patent:

UNITED STATES PATENTS

| Number | Name | Date |
| --- | --- | --- |
| 2,135,531 | Reichert | Nov. 8, 1938 |
| 2,225,039 | Diggins | Dec. 17, 1940 |
| 2,392,154 | Kende | Jan. 1, 1946 |
| 2,400,252 | Noske | May 14, 1946 |

FOREIGN PATENTS

| Number | Country | Date |
| --- | --- | --- |
| 475,789 | France | Mar. 27, 1915 |
| 285,116 | Germany | June 21, 1915 |
| 285,677 | Germany | July 10, 1915 |
| 141,961 | Great Britain | Apr. 29, 1920 |
| 377,239 | Germany | June 15, 1923 |
| 274,616 | Great Britain | July 28, 1927 |
| 449,552 | Great Britain | June 29, 1936 |